United States Patent
Wu et al.

(10) Patent No.: US 12,490,233 B2
(45) Date of Patent: Dec. 2, 2025

(54) METHOD AND APPARATUS FOR ENHANCEMENTS ON PAGING EARLY INDICATION (PEI) DESIGN

(71) Applicant: MediaTek Inc., Hsinchu (TW)

(72) Inventors: Wei-De Wu, Hsinchu (TW); Yi-Ju Liao, Hsinchu (TW); Yi-Chia Lo, Hsinchu (TW)

(73) Assignee: MediaTek Inc. (TW)

( * ) Notice: Subject to any disclaimer, the term of this patent is extended or adjusted under 35 U.S.C. 154(b) by 478 days.

(21) Appl. No.: 17/965,634

(22) Filed: Oct. 13, 2022

(65) Prior Publication Data
US 2023/0145193 A1 May 11, 2023

Related U.S. Application Data

(60) Provisional application No. 63/275,977, filed on Nov. 5, 2021.

(51) Int. Cl.
*H04W 68/02* (2009.01)
*H04W 56/00* (2009.01)

(52) U.S. Cl.
CPC ......... *H04W 68/02* (2013.01); *H04W 56/001* (2013.01)

(58) Field of Classification Search
CPC . H04W 68/02; H04W 56/001; H04W 68/025; H04W 52/0229; H04W 52/0248; H04W 68/005
See application file for complete search history.

(56) References Cited

U.S. PATENT DOCUMENTS

| | | |
|---|---|---|
| 2012/0122495 A1 | 5/2012 | Weng et al. |
| 2022/0046585 A1 | 2/2022 | Wu et al. |
| 2022/0124674 A1* | 4/2022 | Babaei .................. H04W 68/02 |
| 2023/0093248 A1 | 3/2023 | Kim |

(Continued)

FOREIGN PATENT DOCUMENTS

| | | | |
|---|---|---|---|
| CN | 110446258 A * | 11/2019 | .......... H04W 68/005 |
| CN | 111052835 A | 4/2020 | |
| CN | 112544114 A | 3/2021 | |

(Continued)

OTHER PUBLICATIONS

USPTO, Office Action in U.S. Appl. No. 17/965,630, filed Mar. 12, 2015.

(Continued)

*Primary Examiner* — Dinh Nguyen
(74) *Attorney, Agent, or Firm* — Andy M. Han; Han IP PLLC

(57) ABSTRACT

Various solutions for enhancements on paging early indication-occasion (PEI-O) monitoring are described. An apparatus may receive a first radio resource control (RRC) parameter from a network node. The first RRC parameter indicates an offset before a first paging frame (PF). The apparatus may determine a time location of a PEI-O according to a reference point determined by the offset. The PEI-O is associated with one or more paging occasions (POs) in one or more paging frames (PFs) starting from the first PF. The apparatus may monitor the PEI-O to detect whether a PEI is received from the network node. The PEI indicates whether there is a paging for a subgroup to which the apparatus belongs.

14 Claims, 5 Drawing Sheets

(56) References Cited

U.S. PATENT DOCUMENTS

2024/0334393 A1    10/2024    Hwang et al.

FOREIGN PATENT DOCUMENTS

| CN | 113056951 A | 6/2021 |
|---|---|---|
| WO | WO 2021180206 A1 | 9/2021 |

OTHER PUBLICATIONS

Taiwan Intellectual Property Office, Office Action in Taiwan Patent Application No. 111142177, May 24, 2023.
ETSI: "5G; NR; Radio Resource Control (RRC); Protocol specification (3GPP TS 38.331 version 15.15.0 Release 15)".
European Patent Office, Extended European Search Report in European Patent Application No. 22205308.4, Mar. 15, 2023.
Mediatek: "Summary of email discussion on Rel-17 RRC parameters for UE power saving", 3GPP TSG RAN WG1 #106bis-e, R1-2110679, e-Meeting, Oct. 11-19, 2021, XP052065877.
Lenovo et al: "Paging enhancement for UE power saving", 3GPP TSG RAN WG1 #106bis-e, R1-2109944, e-Meeting, Oct. 11-19, 2021, XP052058862.
MCC Support: "Draft Report of 3GPP TSG RAN WG1 #106b-e v0.2.0", 3GPP TSG RAN WG1 #107-e, R1-211xxxx, e-Meeting, Oct. 11-19, 2021, XP052076385.
LG Electronics: "Discussion on potential paging enhancements", 3GPP TSG RAN WG1 #106b-e, R1-2109980, e-Meeting, Oct. 11-19, 2021, XP052058916.
Taiwan Intellectual Property Office, Office Action in Taiwan Patent Application No. 111142176, Apr. 27, 2023.
Mediatek: "Summary of Paging Enhancements", 3GPP TSG RAN WG1 #104-bis-e, R1-210xxxx, e-Meeting, Apr. 12-20, 2021.
European Patent Office, Extended European Search Report in European Patent Application No. 22205306.8, Mar. 14, 2023.
Vivo: "Paging enhancements for idle/inactive mode UE power saving", 3GPP TSG RAN WG1 #106bis-e, R1-2108985, e-Meeting, Oct. 11-19, 2021, XP052057946.
Mediatek: "Summary#5 of Paging Enhancements", 3GPP TSG RAN WG1 #106bis-e, R1-2110671, e-Meeting, Oct. 11-19, 2021, XP052065871.
CMCC: "Session notes for 8.7 (UE Power Saving Enhancements)", 3GPP TSG RAN WG1 #106bis-e, R1-2110616, e-Meeting, Oct. 11-19, 2021, XP052071781.
Asia Pacific Telecom et al: "Paging Enhancements for Power Saving", 3GPP TSG RAN WG2 #113, R2-2101841, Jan. 25-Feb. 5, 2021.
USPTO, Notice of Allowance in U.S. Appl. No. 17/965,630, filed Aug. 12, 2025.
China National Intellectual Property Administration, 1st Office Action in China Application No. 202211363923.4, Aug. 7, 2025.

* cited by examiner

METHOD AND APPARATUS FOR ENHANCEMENTS ON PAGING EARLY INDICATION (PEI) DESIGN

CROSS REFERENCE TO RELATED PATENT APPLICATION(S)

The present disclosure claims the priority benefit of U.S. Provisional Patent Application No. 63/275,977, filed on 5 Nov. 2021. The contents of aforementioned application are herein incorporated by reference in their entirety.

TECHNICAL FIELD

The present disclosure is generally related to mobile communications and, more particularly, to enhancements on paging early indication-occasion (PEI-O) monitoring.

BACKGROUND

Unless otherwise indicated herein, approaches described in this section are not prior art to the claims listed below and are not admitted as prior art by inclusion in this section.

Paging is a procedure a wireless network uses to find out the location of a UE, before the actual connection establishment. For example, paging may be used to alert the UE of an incoming session (call). In most cases, the paging process happens while the UE is in a radio resource control (RRC) idle mode. This means that UE has to monitor whether the network is sending any paging message to it and it has to spend some energy to run this "monitoring" process. In the RRC idle mode, the UE may enter or stay in a sleep mode defined in discontinuous reception (DRX) cycle. The UE may periodically wake up and monitor physical downlink control channel (PDCCH) to check for the presence of a paging message. If the PDCCH indicates that a paging message is transmitted in a subframe, then the UE may demodulate the paging channel to see if the paging message is directed to it.

In the current 5G new radio (NR) framework, LOOP operations (including automatic gain control (AGC), frequency tracking loop (FTL), and time tracking loop (TTL)) and measurements (MEAS) can only be performed in certain occasions, due to the synchronization signal block (SSB) transmission scheme in 5G NR. As a result, the gap between the SSBs for LOOP/MEAS and paging occasion (PO) is longer, and the UE may enter light sleep mode in the gap. If there is an indication before paging and the UE can monitor PO only if paging is indicated, then the UE can save power consumption not only for paging reception, but also for the light sleep between the SSBs and PO. However, there are some remaining issues regarding monitoring such indication. For example, the time and/or frequency location of the monitoring occasion for such indication needs to be signalled to the UE, so that the UE can know where and when to monitor such indication. Therefore, a solution is sought to provide to the UE with the time and/or frequency location of the monitoring occasions for such indication.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to enhancements on paging early indication-occasion (PEI-O) monitoring.

In one aspect, a method may involve an apparatus receiving a first radio resource control (RRC) parameter from a network node, wherein the first RRC parameter indicates an offset before a first paging frame (PF). The method may also involve the apparatus determining a time location of a PEI-O according to a reference point determined by the offset, wherein the PEI-O is associated with one or more paging occasions (POs) in one or more paging frames (PFs) starting from the first PF. The method may also involve the apparatus monitoring the PEI-O to detect whether a PEI is received from the network node, wherein the PEI indicates whether there is a paging for a subgroup to which the apparatus belongs.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a first RRC parameter from a network node, wherein the first RRC parameter indicates an offset before a first PF. The processor may also perform operations comprising determining a time location of a PEI-O according to a reference point determined by the offset, wherein the PEI-O is associated with one or more POs in one or more PFs starting from the first PF. The processor may also perform operations comprising monitoring, via the transceiver, the PEI-O to detect whether a PEI is received from the network node, wherein the PEI indicates whether there is a paging for a subgroup to which the apparatus belongs.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancements on paging early indication-occasion (PEI-O) monitoring. According to the present disclosure, a number of possible solutions may be implemented separately or jointly. That is, although these possible solutions may be described below separately, two or more of these possible solutions may be implemented in one combination or another.

In $3^{rd}$ Generation Partnership Project (3GPP), a radio access network (e.g., 5G NR access network) may include a plurality of base stations (e.g., Next Generation Node-Bs (gNBs)) to communicate with a plurality of mobile stations referred as user equipment (UEs). Paging is a procedure the wireless network uses to find out the location of a UE, before the actual connection establishment. For example, paging is used to alert the UE of an incoming session (e.g., a call). In most cases, the paging process happens while UE is in radio resource control (RRC) idle mode. This means that UE has to monitor whether the network is sending any paging message to it and it has to spend some energy to run this "monitoring" process. In RRC idle mode, a UE gets into and stays in a sleep mode defined in discontinuous reception (DRX) cycle. UE periodically wakes up and monitors physical downlink control channel (PDCCH) to check for the presence of a paging message. If the PDCCH indicates that a paging message is transmitted in a subframe, then the UE demodulates the signal received on the paging channel to see if the paging message is directed to it.

Figure 1:
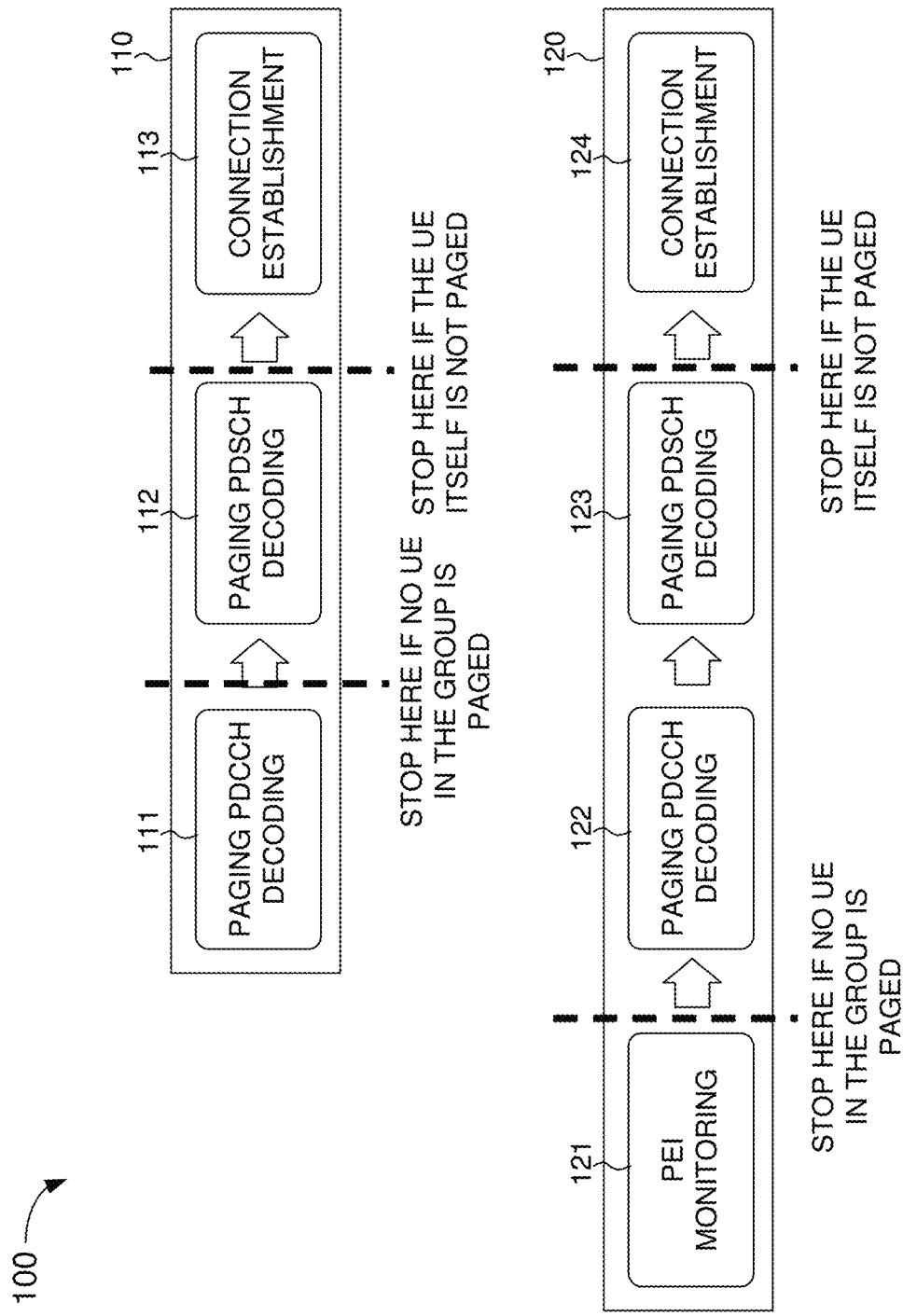
FIG. 1 is a diagram depicting an example scenario under schemes in accordance with implementations of the present disclosure.

In 5G new radio (NR), an indication before paging, e.g., paging early indicator (PEI), is introduced to provide enhanced power saving for paging reception. FIG. 1 illustrates an example scenario 100 under schemes in accordance with implementations of the present disclosure. As shown in scenario 100, top diagram 110 depicts a paging reception procedure without PEI, while bottom diagram 120 depicts a paging reception procedure with PEI. Note that a subgroup of UEs may be associated with the same PO. During a conventional paging reception procedure in diagram 110, a UE may periodically wake up and perform paging PDCCH decoding (denoted as 111 in FIG. 1). If no UE in the UE subgroup is paged, then the UE may stop paging PDCCH decoding and enter the light sleep mode. Otherwise, if a UE in the UE subgroup is paged, the UE may perform paging physical downlink shared channel (PDSCH) decoding (denoted as 112 in FIG. 1). If the UE itself is not paged, then the UE may stop paging PDSCH decoding and enter the deep sleep mode. Otherwise, the UE may perform connection establishment (denoted as 113 in FIG. 1). During a novel paging reception procedure in diagram 120, a UE may periodically wake up and check for PEI first (denoted as 121 in FIG. 1). If no UE in the UE subgroup is paged, then the UE may stop PEI monitoring and enter the deep sleep mode. Otherwise, if a UE in the UE subgroup is paged, the UE may perform paging PDCCH decoding (denoted as 122 in FIG. 1) as well as paging PDSCH decoding (denoted as 123 in FIG. 1). If the UE itself is not paged, then the UE may stop paging PDSCH decoding and enter the deep sleep mode. Otherwise, if the UE itself is paged, the UE may perform connection establishment (denoted as 124 in FIG. 1).

Under the novel paging reception procedure in diagram 120, the UE can skip PO monitoring if the detected PEI indicates no paging (i.e., there is no paging for the UE's subgroup). The UE's main receiver is turned on in every paging cycle, for LOOP operations, measurements (MEAS), and PEI reception. If PEI indicates no paging, then after performing required measurements, UE may turn off its main receiver and enter the deep sleep mode, e.g., until the next PEI.

Figure 2:
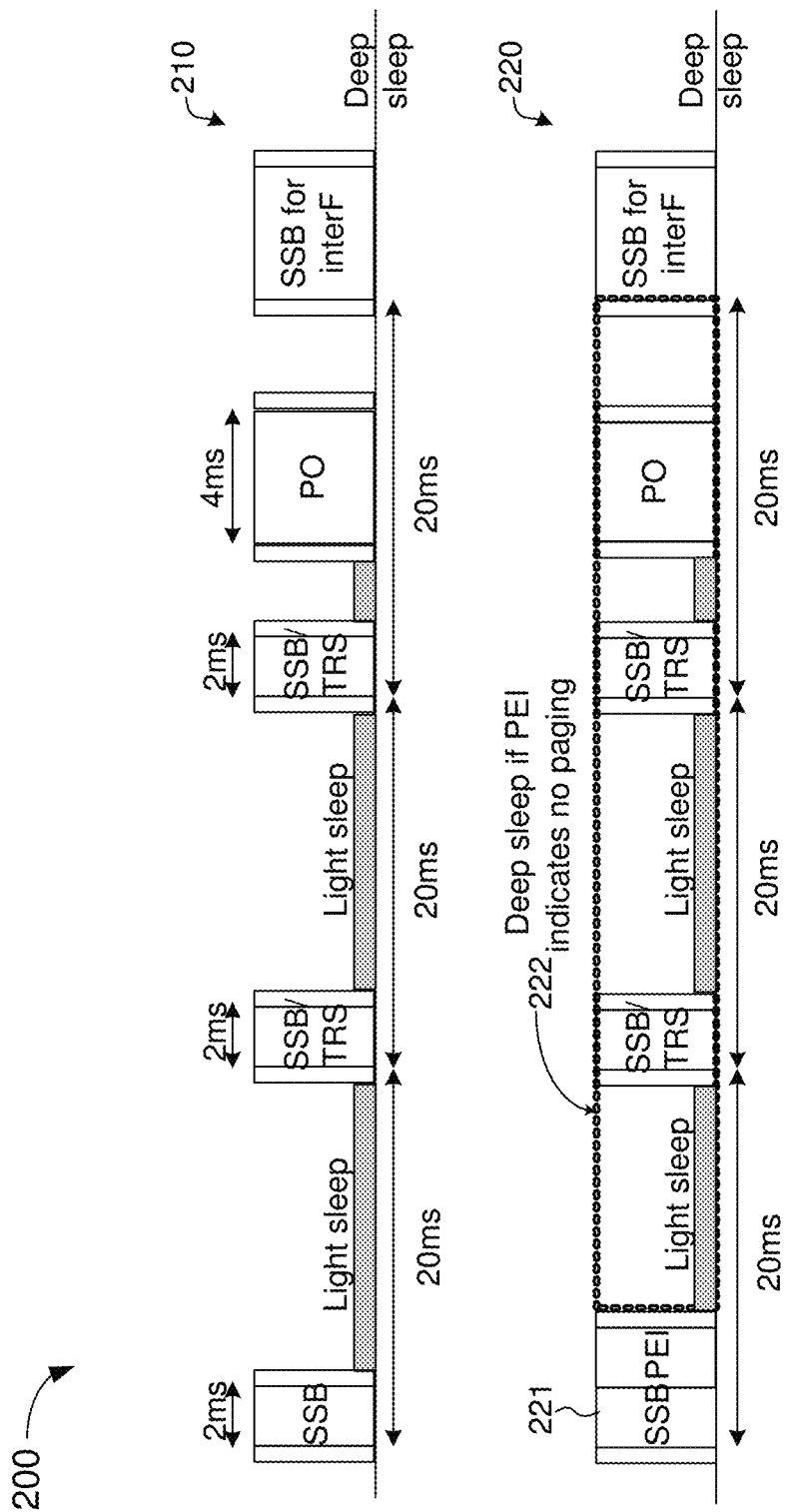
FIG. 2 is a diagram depicting an example scenario under schemes in accordance with implementations of the present disclosure.

FIG. 2 illustrates an example scenario 200 under schemes in accordance with implementations of the present disclosure. Scenario 200 illustrates the concept of providing PEI for additional power saving during paging reception. Diagram 210 depicts the synchronization signal block (SSB) transmission scheme in the paging reception procedure without PEI, where LOOP operations (including automatic gain control (AGC), frequency tracking loop (FTL), and time tracking loop (TTL)) and MEAS can only be performed in certain occasions, e.g., during SSB/TRS bursts. The UE wakes up for SSBs/TRSs, e.g., every 20 ms (every 2 radio frames). The UE may enter the light sleep mode in the gap between the SSBs/TRSs for LOOP/MEAS and the PO.

PEIs expected to be transmitted may be located near SSB bursts, thus aiming at power saving not only PO monitoring but also light sleep(s) and state transitions, when no UE is paged. A UE may need extra time for PEI monitoring in addition to SSB. In diagram 220, a PEI is detected next to the SSB burst 221. If the PEI indicates that there is no paging for the UE's subgroup (i.e., no paging), then the UE may enter deep sleep in 222, e.g., entering the deep sleep mode in the gap from the reception of the PEI to the end of the corresponding PF. That is, with the PEI indicating no paging, the UE does not need to enter the light sleep mode and constantly wake up to receive the SSBs/TRSs in the gap between the PEI and the corresponding PF. Note that the UE may be required to perform intra-frequency or inter-frequency measurements when signal quality of the serving cell is below certain threshold. Usually, the UE performs the required measurements when it wakes up for paging monitoring (i.e., every paging cycle), then the UE may stay in the deep sleep mode, e.g., until next PEI. Since PEIs expected to be transmitted are located near SSB bursts, power saving can be achieved not only for PO monitoring but also for light sleep between the last SSB/PEI and the PO and state transitions (e.g., the power mode transition from/to normal mode to/from light sleep mode), when no UE in the UE group is paged. Note that Low-signal-to-interference-plus-noise ratio (Low-SINR) UEs need to wake up earlier, i.e., monitor more SSB bursts (larger $N_{SSB}$) before being able to decode a paging message. High-SINR UEs may wake up later before PO monitoring. Therefore, if there is only one PEI for each PO, PEI needs to be relatively early in order to cover a wide range of SINR values since a PEI serves many UEs.

It should be appreciated that, with the support of PEI, the UE's power saving may be enhanced. However, there are some remaining issues regarding PEI monitoring. For example, the time and/or frequency location of the monitoring occasion for PEI needs to be signalled to the UE, so that the UE can know where and when to monitor PEI. Therefore, a solution is sought to provide to the UE with the time and/or frequency location of the monitoring occasions for PEI (also referred to as PEI-Occasion (PEI-O)).

In view of the above, the present disclosure proposes a number of schemes pertaining to enhancements on PEI monitoring. According to some schemes of the present disclosure, an offset dedicated for locating the PEI-O is provided in a radio resource control (RRC) parameter to the UE, and the UE may determine the time location of the PEI-O according to a reference point determined by the offset and monitor the PEI-O to detect whether a PEI is received from a network node. By applying the schemes of the present disclosure, a UE may know when and where to monitor the PEI-O. Specifically, the offset represents an offset before a PF, and information of the monitoring occasion for the PEI-O is provided by, e.g., broadcast information such as a system information block (SIB). In some implementations, the RRC parameter may be received in a system information block 1 (SIB1). In some implementations, the reference point is a start of a reference frame before the first PF of the associated POs with the PEI-O. In some implementations, the reference frame comprises a burst of a synchronization signal block (SSB).

Figure 3:
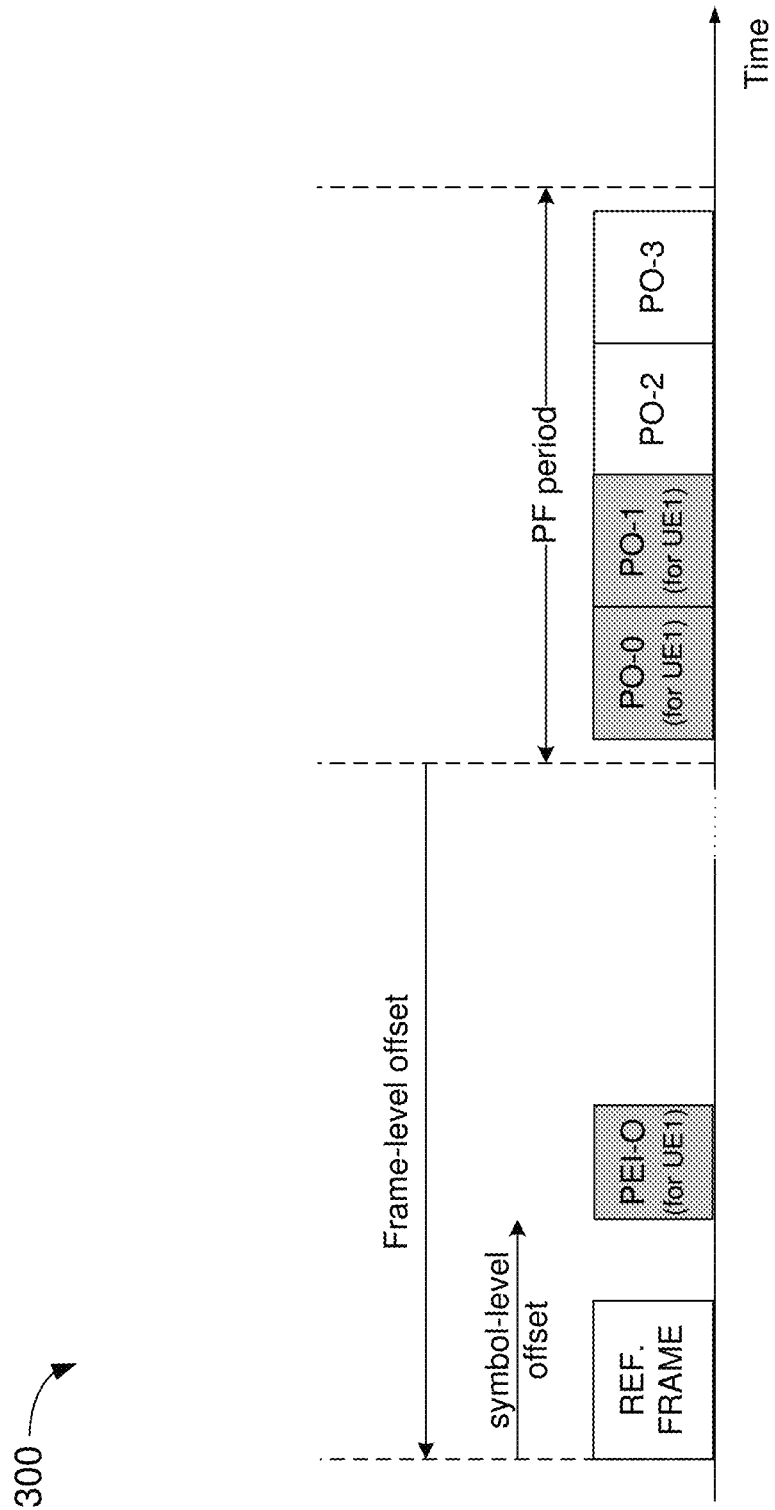
FIG. 3 is a diagram depicting an example scenario under schemes in accordance with implementations of the present disclosure.

FIG. 3 illustrates an example scenario 300 under schemes in accordance with implementations of the present disclosure. Scenario 300 illustrates an example of locating a PEI-O. As shown in scenario 300, there are four POs in a PF, and the first two POs are associated with the PEI for UE-1. The time location of the PEI-O for the UE's PO may be determined by a reference point and an offset from the reference point to the start of the first PDCCH monitoring occasion for this PEI-O. The reference point may be the start of a reference frame determined by a frame-level offset from the start of the first PF of the PF(s) associated with the PEI-O. The offset may be a symbol-level offset from the reference point to the start of the first PDCCH monitoring occasion of the PEI-O.

According to some schemes of the present disclosure, a dedicated search space for PEI may be configured in an RRC parameter to a UE, and the UE may monitor the PEI-O according to the dedicated search space for PEI. In some implementations, the RRC parameter may be received in a SIB1. By applying the schemes of the present disclosure, the dedicated search space for PEI may be separately configured and different from other search spaces (e.g., the paging search space or the common search space). For example, the dedicated search space for PEI may be configured with its own PDCCH candidate number and/or aggregation level to better support PEI-O monitoring.

Illustrative Implementations

Figure 4:
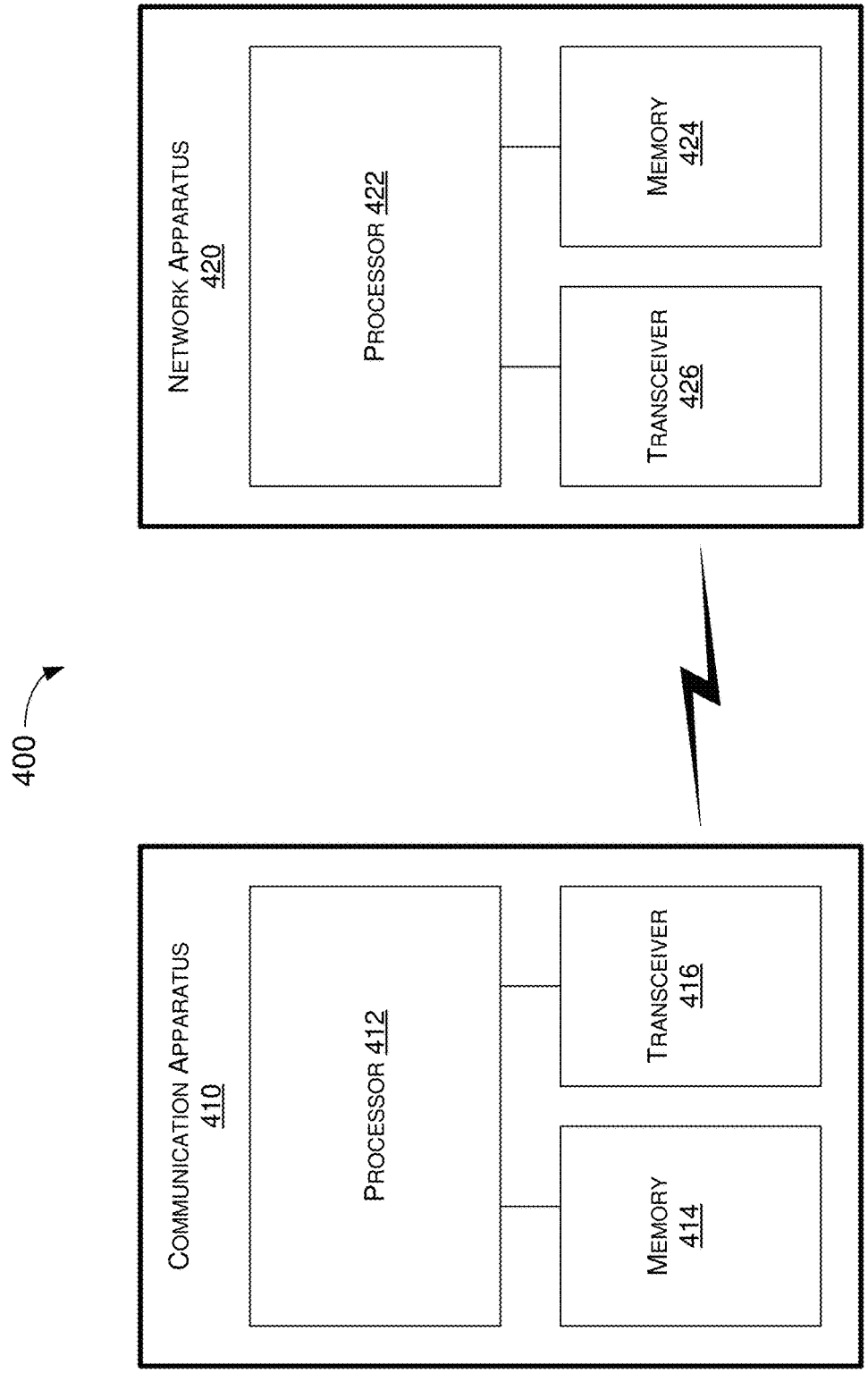
FIG. 4 is a block diagram of an example communication system in accordance with an implementation of the present disclosure.

FIG. 4 illustrates an example communication system 400 having an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to enhancements on PEI-O monitoring, including scenarios/schemes described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT, NB-IoT, or IIoT apparatus such as an immobile or a stationary apparatus, a home apparatus, a wire communication apparatus, or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 4 such as a processor 412, for example. Communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT, NB-IoT or IIoT network. Alternatively, network apparatus 420 may be implemented in the form of one or more IC chips such as, for example and without limitation, one or more single-core processors, one or more multi-core processors, or one or more RISC or CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including autonomous reliability enhancements in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may receive, via transceiver 416, a first RRC parameter from the network apparatus 420, wherein the first RRC parameter indicates an offset before a first PF. Then, processor 412 may determine a time location of a PEI-O according to a reference point determined by the offset, wherein the PEI-O is associated with one or more POs in one or more PFs starting from the first PF. Also, processor 412 may monitor, via transceiver 416, the PEI-O to detect whether a PEI is received from the network apparatus 420, wherein the PEI indicates whether there is a paging for a subgroup to which the communication apparatus 410 belongs.

Illustrative Processes

Figure 5:
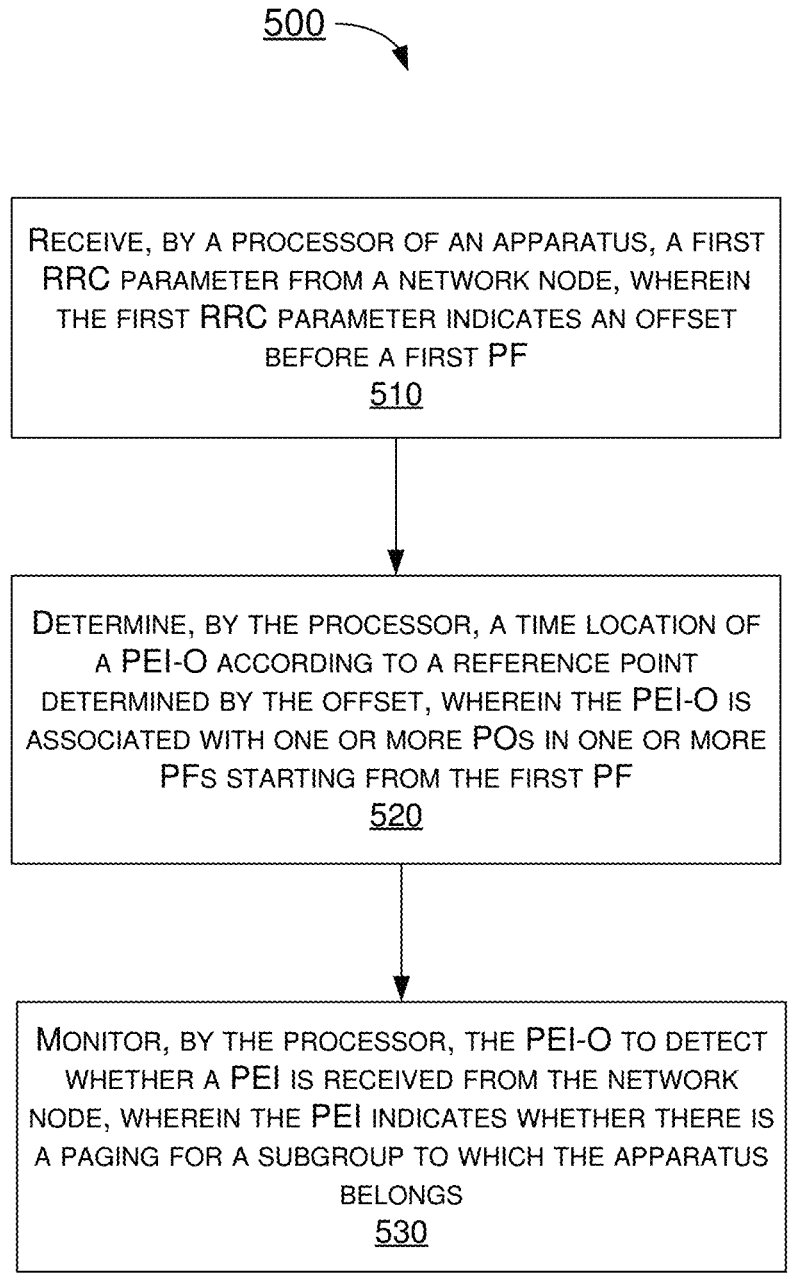
FIG. 5 is a flowchart of an example process in accordance with an implementation of the present disclosure.

FIG. 5 illustrates an example process 500 in accordance with an implementation of the present disclosure. Process 500 may be an example implementation of above scenarios/schemes, whether partially or completely, with respect to enhancements on PEI-O monitoring. Process 500 may represent an aspect of implementation of features of communication apparatus 410. Process 500 may include one or more operations, actions, or functions as illustrated by one or more of blocks 510 to 530. Although illustrated as discrete blocks, various blocks of process 500 may be divided into additional blocks, combined into fewer blocks, or eliminated, depending on the desired implementation. Moreover, the blocks of process 500 may be executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve a processor (e.g., processor 412) of an apparatus (e.g., communication apparatus 410) receiving, via a transceiver (e.g., transceiver 416), a first RRC parameter from a network node (e.g., network apparatus 420), wherein the first RRC parameter indicates an offset before a first PF. Process 500 may proceed from 510 to 520.

At 520, process 500 may involve the processor determining a time location of a PEI-O according to a reference point determined by the offset, wherein the PEI-O is associated with one or more POs in one or more PFs starting from the first PF. Process 500 may proceed from 520 to 530.

At 530, process 500 may involve the processor monitoring, via the transceiver, the PEI-O to detect whether a PEI is received from the network node, wherein the PEI indicates whether there is a paging for a subgroup to which the apparatus belongs.

In some implementations, the first RRC parameter is received in a SIB1.

In some implementations, the reference point is a start of a reference frame before the first PF of the associated POs with the PEI-O.

In some implementations, the reference frame comprises a burst of a synchronization signal block (SSB).

In some implementations, process 500 may further involve the processor receiving, via the transceiver, a second RRC parameter from the network node, wherein the second RRC parameter indicates a dedicated search space for PEI, and wherein the monitoring of the PEI-O is performed according to the dedicated search space for PEI.

In some implementations, the second RRC parameter is received in a SIB1.

In some implementations, process 500 may further involve the processor monitoring, via the transceiver, a PO associated with the apparatus in a case that the PEI indicates there being a paging for the subgroup to which the apparatus belongs.

In some implementations, process 500 may further involve the processor receiving, via the transceiver, one or more SSBs or one or more TRSs before the one or more POs in the one or more PFs in a case that the PEI indicates there being a paging for the subgroup to which the apparatus belongs.

In some implementations, process 500 may further involve the processor performing, via the transceiver, at least one of a frequency tracking and a time tracking based on the one or more SSBs or the one or more TRSs.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a first radio resource control (RRC) parameter from a network node,
wherein the first RRC parameter indicates a frame-level offset before a first paging frame (PF);
determining, by the processor, a time location of a paging early indication-occasion (PEI-O) according to a reference frame determined by the frame-level offset,
wherein the PEI-O is associated with one or more paging occasions (POs) in one or more paging frames (PFs) starting from the first PF, and the reference frame comprises a burst of a synchronization signal block (SSB); and
monitoring, by the processor, the PEI-O to detect whether a PEI is received from the network node,
wherein the PEI indicates whether there is a paging for a subgroup to which the apparatus belongs; and
receiving, by the processor, a second RRC parameter from the network node, wherein the second RRC parameter indicates a symbol-level offset from a start of the reference frame; and wherein the timing location of the PEI-O is further determined according to the symbol-level offset.

2. The method of claim 1, wherein the first RRC parameter is received in a system information block 1 (SIB1).

3. The method of claim 1, further comprising:
receiving, by the processor, a second RRC parameter from the network node, wherein the second RRC parameter indicates a dedicated search space for PEI; and wherein the monitoring of the PEI-O is performed according to the dedicated search space for PEI.

4. The method of claim 3, wherein the second RRC parameter is received in a system information block 1 (SIB1).

5. The method of claim 1, further comprising: monitoring, by the processor, a PO associated with the apparatus in a case that the PEI indicates there being a paging for the subgroup to which the apparatus belongs.

6. The method of claim 1, further comprising: receiving, by the processor, one or more synchronization signal blocks (SSBs) or one or more tracking reference signals (TRSs) before the one or more POs in the one or more PFs in a case that the PEI indicates there being a paging for the subgroup to which the apparatus belongs.

7. The method of claim 6, further comprising: performing, by the processor, at least one of a frequency tracking and a time tracking based on the one or more SSBs or the one or more TRSs.

8. An apparatus, comprising:
a transceiver which, during operation, wirelessly communicates with a network node of a wireless network; and
a processor communicatively coupled to the transceiver such that, during operation, the processor performs operations comprising:

receiving, via the transceiver, a first radio resource control (RRC) parameter from the network node,
wherein the first RRC parameter indicates a frame-level offset before a first paging frame (PF);
determining a time location of a paging early indication-occasion (PEI-O) according to a reference frame determined by the frame-level offset,
wherein the PEI-O is associated with one or more paging occasions (POs) in one or more paging frames (PFs) starting from the first PF, and the reference frame comprises a burst of a synchronization signal block (SSB); and
monitoring, via the transceiver, the PEI-O to detect whether a PEI is received from the network node,
wherein the PEI indicates whether there is a paging for a subgroup to which the apparatus belongs; and
wherein, during operation, the processor further performs operations comprising:
receiving, via the transceiver, a second RRC parameter from the network node, wherein the second RRC parameter indicates a symbol-level offset from a start of the reference frame; and wherein the timing location of the PEI-O is further determined according to the symbol-level offset.

9. The apparatus of claim 8, wherein the first RRC parameter is received in a system information block 1 (SIB1).

10. The apparatus of claim 8, wherein, during operation, the processor further performs operations comprising: receiving, via the transceiver, a second RRC parameter from the network node, wherein the second RRC parameter indicates a dedicated search space for PEI; and wherein the monitoring of the PEI-O is performed according to the dedicated search space for PEI.

11. The apparatus of claim 10, wherein the second RRC parameter is received in a system information block 1 (SIB1).

12. The apparatus of claim 8, wherein, during operation, the processor further performs operations comprising: monitoring, via the transceiver, a PO associated with the apparatus in a case that the PEI indicates there being a paging for the subgroup to which the apparatus belongs.

13. The apparatus of claim 8, wherein, during operation, the processor further performs operations comprising: receiving, via the transceiver, one or more synchronization signal blocks (SSBs) or one or more tracking reference signals (TRSs) before the one or more POs in the one or more PFs in a case that the PEI indicates there being a paging for the subgroup to which the apparatus belongs.

14. The apparatus of claim 13, wherein, during operation, the processor further performs operations comprising: performing, via the transceiver, at least one of a frequency tracking and a time tracking based on the one or more SSBs or the one or more TRSs.

* * * * *